(12) United States Patent
Kobayashi

(10) Patent No.: US 6,862,412 B2
(45) Date of Patent: Mar. 1, 2005

(54) ROTARY DIAL DEVICE HAVING A CLICK STOP MECHANISM

(75) Inventor: Kazuharu Kobayashi, Kanagawa (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/697,334

(22) Filed: Oct. 31, 2003

(65) Prior Publication Data

US 2004/0091260 A1 May 13, 2004

(30) Foreign Application Priority Data

Nov. 1, 2002 (JP) .......................................... 2002-319456

(51) Int. Cl.$^7$ ............................................... G03B 17/00
(52) U.S. Cl. ........................................................ 396/543
(58) Field of Search ........................................ 396/543

(56) References Cited

U.S. PATENT DOCUMENTS

| | | | | |
|---|---|---|---|---|
| 3,293,382 A | * | 12/1966 | Lewandowski et al. | ........ 200/14 |
| 3,677,096 A | * | 7/1972 | Hatman | ........................ 74/527 |
| 3,736,390 A | * | 5/1973 | Lockard | ................ 200/11 DA |
| 4,069,723 A | * | 1/1978 | Payerle | ......................... 74/528 |
| 4,346,269 A | * | 8/1982 | Slavin et al. | ........... 200/11 DA |
| 4,379,955 A | * | 4/1983 | Comerford | ............. 200/11 DA |
| 5,742,853 A | | 4/1998 | Haga et al. | |
| 5,749,005 A | | 5/1998 | Haga et al. | |
| 5,970,267 A | | 10/1999 | Inazuka et al. | |
| 6,615,000 B2 | | 9/2003 | Itabashi | |
| 2002/0187001 A1 | | 12/2002 | Hattori et al. | |

* cited by examiner

*Primary Examiner*—David M. Gray
(74) *Attorney, Agent, or Firm*—Greenblum & Bernstein, P.L.C.

(57) ABSTRACT

A rotary dial device having a click stop mechanism, includes a stationary member; a rotary dial rotatably supported by the stationary member; a ball guide groove formed on the stationary member to extend in a radial direction of the rotary dial; a ball positioned in the ball guide groove; at least one protrusion and at least one depression which are formed on the rotary dial along one of two imaginary cylindrical surfaces with axes thereof on an axis of the rotary dial, the two imaginary cylindrical surfaces being positioned radially outside and inside the ball guide groove in the radial direction of the rotary dial, respectively; and a cylindrical resilient member positioned along the other of the two imaginary cylindrical surfaces to bring the ball into pressing contact with any one of the protrusion and the depression by resiliency of the cylindrical resilient member.

11 Claims, 7 Drawing Sheets

ROTARY DIAL DEVICE HAVING A CLICK STOP MECHANISM

BACKGROUND OF THE INVENTION

1. Field of the Invention

The present invention relates to a rotary dial device having a click stop mechanism, wherein a rotary dial (e.g., a select dial of a camera) rotates stepwise for selecting, e.g., desired settings by a series of audible clicks.

2. Description of the Related Art

In conventional rotary dial devices with a click stop mechanism for making a rotary dial (e.g., a select dial of a camera) stop with a click at any one of a predetermined plurality of click-stopped positions when the rotary dial is rotated, it is often the case that the click stop mechanism is provided with a click plate (ring plate) which is disposed coaxially with the rotary dial and on which a plurality of holes determining the plurality of click-stopped positions are formed. However, in conventional rotary dial devices having such structure, the click plate must be provided independently of the rotary dial, which is space-consuming.

On the other hand, in another type of conventional rotary dial device having a click stop mechanism in which the rotary dial is provided, on an inner periphery of a circumferential wall of the rotary dial, with a plurality of holes determining a plurality of click-stopped positions and in which a compression spring is disposed inside the rotary dial, it is difficult to reduce the diameter of the rotary dial even though the click stop mechanism does not have to be provided with the aforementioned click plate. In addition, a shaft for fixing the rotary dial to a base plate needs to be disposed at an axial position different from the axial position of the compression spring in the axial direction of the rotary dial. This arrangement is space-consuming, and increases the height of the rotary dial.

SUMMARY OF THE INVENTION

The present invention provides a rotary dial device having a click stop mechanism which is space-saving and which can be easily assembled.

According to an aspect of the present invention, a rotary dial device having a click stop mechanism is provided, including a stationary member; a rotary dial supported by the stationary member to be freely rotatable; a ball guide groove formed on the stationary member to extend in a radial direction of the rotary dial; a ball positioned in the ball guide groove; at least one protrusion and at least one depression which are formed on the rotary dial along one of two imaginary cylindrical surfaces with axes thereof on an axis of the rotary dial, the two imaginary cylindrical surfaces being positioned radially outside and inside the ball guide groove in the radial direction of the rotary dial, respectively; and a cylindrical resilient member positioned along the other of the two imaginary cylindrical surfaces to bring the ball into pressing contact with any one of the protrusion and the depression by resiliency of the cylindrical resilient member.

The cylindrical resilient member can be a coil spring.

It is desirable for the coil spring to include two engaging ends which extend in substantially opposite radial directions of the coil spring. The stationary member includes two engaging protrusions which are engaged with the two engaging ends, respectively.

It is desirable for the protrusion and the depression to be formed on an inner periphery of a circumferential wall of the rotary dial.

It is desirable for the protrusion and the depression to be formed on an outer peripheral surface of an internal cylindrical portion of the rotary dial.

In an embodiment, a rotary dial device having a click stop mechanism is provided, including a stationary member; a rotary dial supported by the stationary member to be freely rotatable; at least one protrusion and at least one depression which are formed on an inner periphery of the rotary dial; a ball guide groove formed on the stationary member to extend in a radial direction of the rotary dial and to be positioned radially inside the inner periphery of the rotary dial in the radial direction thereof; a ball positioned in the ball guide groove; and a cylindrical resilient member which brings the ball into pressing contact with the inner periphery of the rotary dial, on which the protrusion and the depression are formed, wherein the cylindrical resilient member is positioned radially inside the ball guide groove in the radial direction thereof, and is substantially concentric with the rotary dial.

The cylindrical resilient member can be a torsion coil spring which has two engaging ends extending in substantially opposite radial directions of the coil spring, and the stationary member can include two engaging protrusions which are engaged with the two engaging ends, respectively.

In another embodiment, a rotary dial device having a click stop mechanism is provided, including a stationary member; a rotary dial supported by the stationary member to be freely rotatable on an axis; at least one protrusion and at least one depression which are formed on an outer peripheral surface of an internal cylindrical portion of the stationary member; a ball guide groove formed on the stationary member to extend in a radial direction of the rotary dial and to be positioned radially outside the outer peripheral surface of the internal cylindrical portion in the radial direction of the rotary dial; a ball positioned in the ball guide groove; and a cylindrical resilient member which brings the ball into pressing contact with the outer peripheral surface of the internal cylindrical portion, on which the protrusion and the depression are formed, wherein the cylindrical resilient member is positioned radially outside the ball guide groove in the radial direction thereof, and is concentric with the rotary dial.

It is desirable for the cylindrical resilient member to be a ring spring.

In another embodiment, a rotary dial device having a click stop mechanism is provided, including a stationary member; a rotary dial supported on the stationary member to be freely rotatable about an axis; a ball guide groove formed on the stationary member to extend in a radial direction of the rotary dial; a ball positioned in the ball guide groove; an undulated surface on which protrusions and depressions are alternately arranged and which is formed on the stationary member to be positioned about the axis; and a cylindrical resilient member positioned about the axis to bring the ball into pressing contact with the undulated surface by resiliency of the cylindrical resilient member. The ball guide groove is positioned between the undulated surface and the cylindrical resilient member in the radial direction of the rotary dial.

In another embodiment, a rotary dial device having a click stop mechanism is provided, including a stationary member having an axial shaft; a rotary dial having a cylindrical portion which is fitted on the axial shaft to be freely rotatable on the axial shaft; a ball guide groove formed on the stationary member to extend in a radial direction of the rotary dial; a ball positioned in the ball guide groove; an undulated surface on which protrusions and depressions are alternately arranged and which is formed on an outer peripheral surface of the cylindrical portion; and a cylindrical resilient member positioned around the cylindrical portion to bring the ball into pressing contact with the undulated surface by resiliency of the cylindrical resilient member. The ball guide groove is positioned between the undulated surface and the cylindrical resilient member in the radial direction of the rotary dial.

The present disclosure relates to subject matter contained in Japanese Patent Application No.2002-319456 (filed on Nov. 1, 2002) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
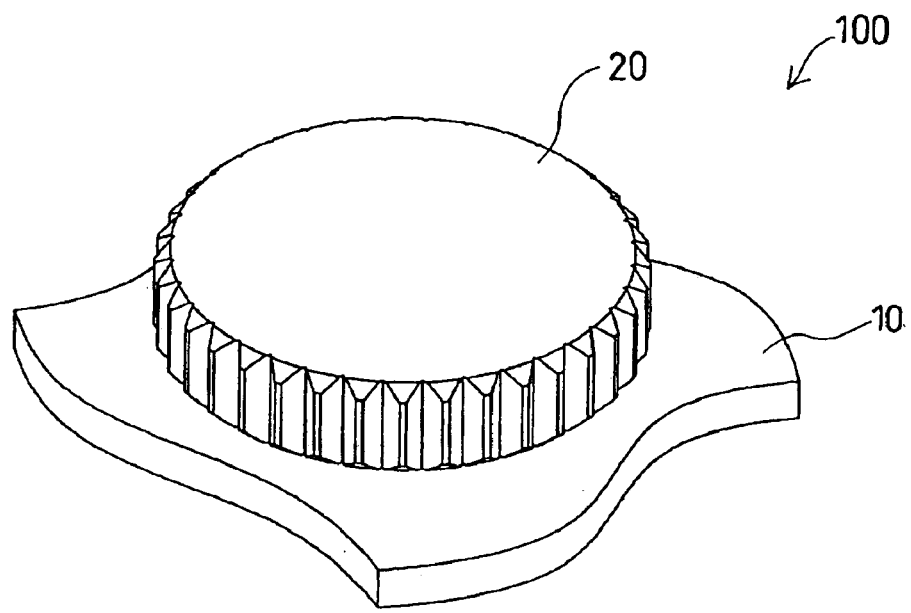
FIG. 1 is a perspective view of a first embodiment of a rotary dial device having a click stop mechanism according to the present invention.
Figure 2:
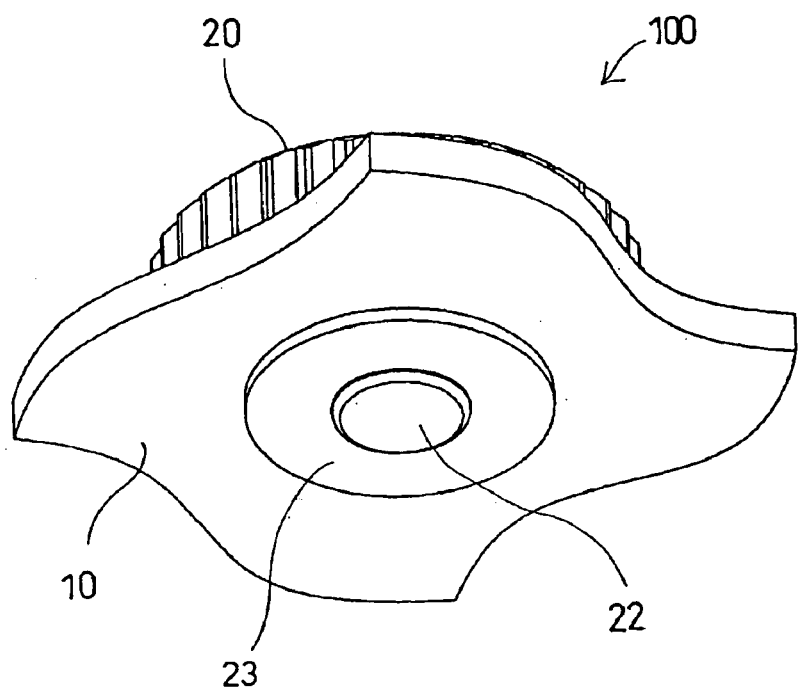
FIG. 2 is a perspective view of the first embodiment of the rotary dial device having a click stop mechanism, viewed from a different angle.
Figure 3:
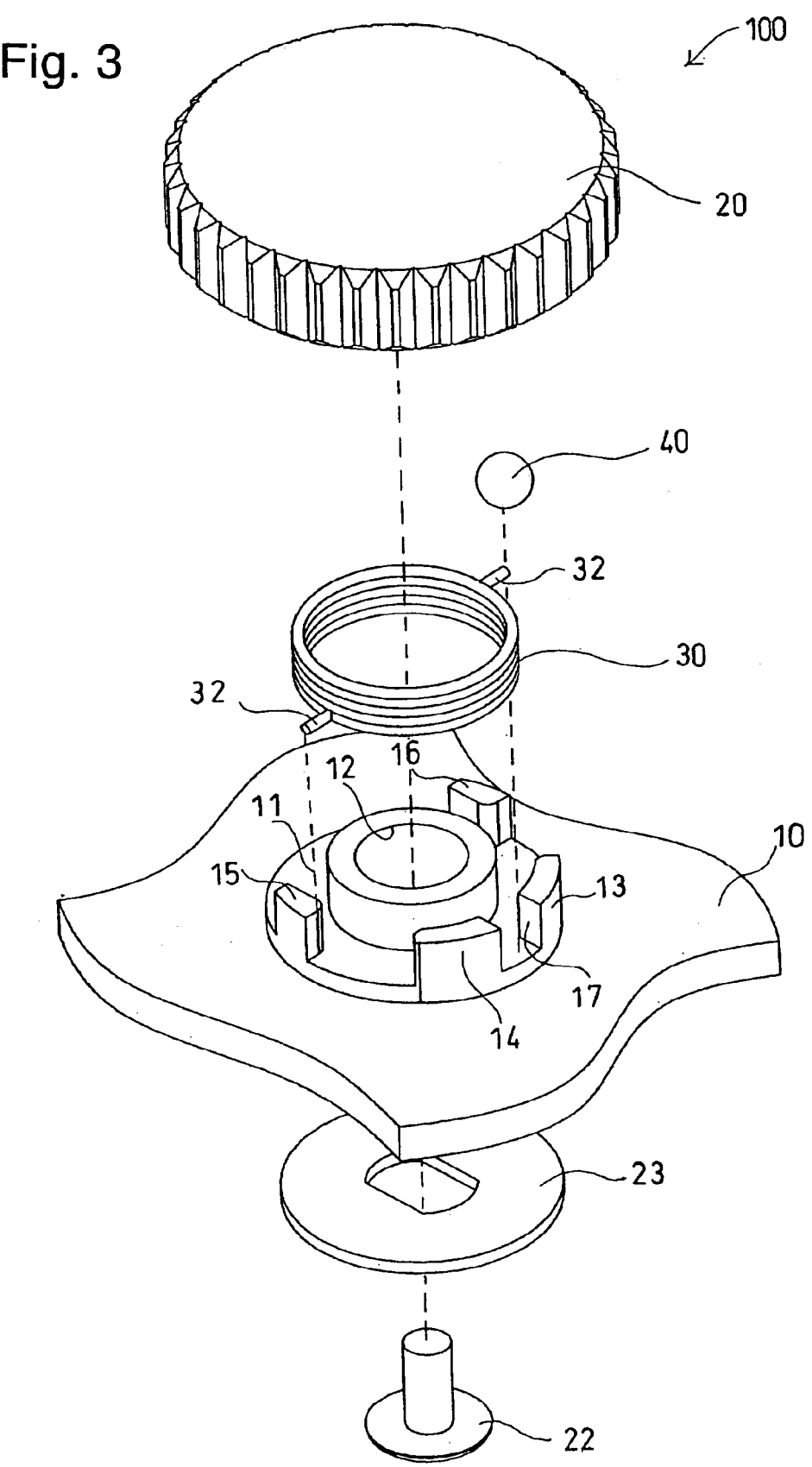
FIG. 3 is an exploded perspective view of the first embodiment of the rotary dial device having a click stop mechanism.
Figure 4:
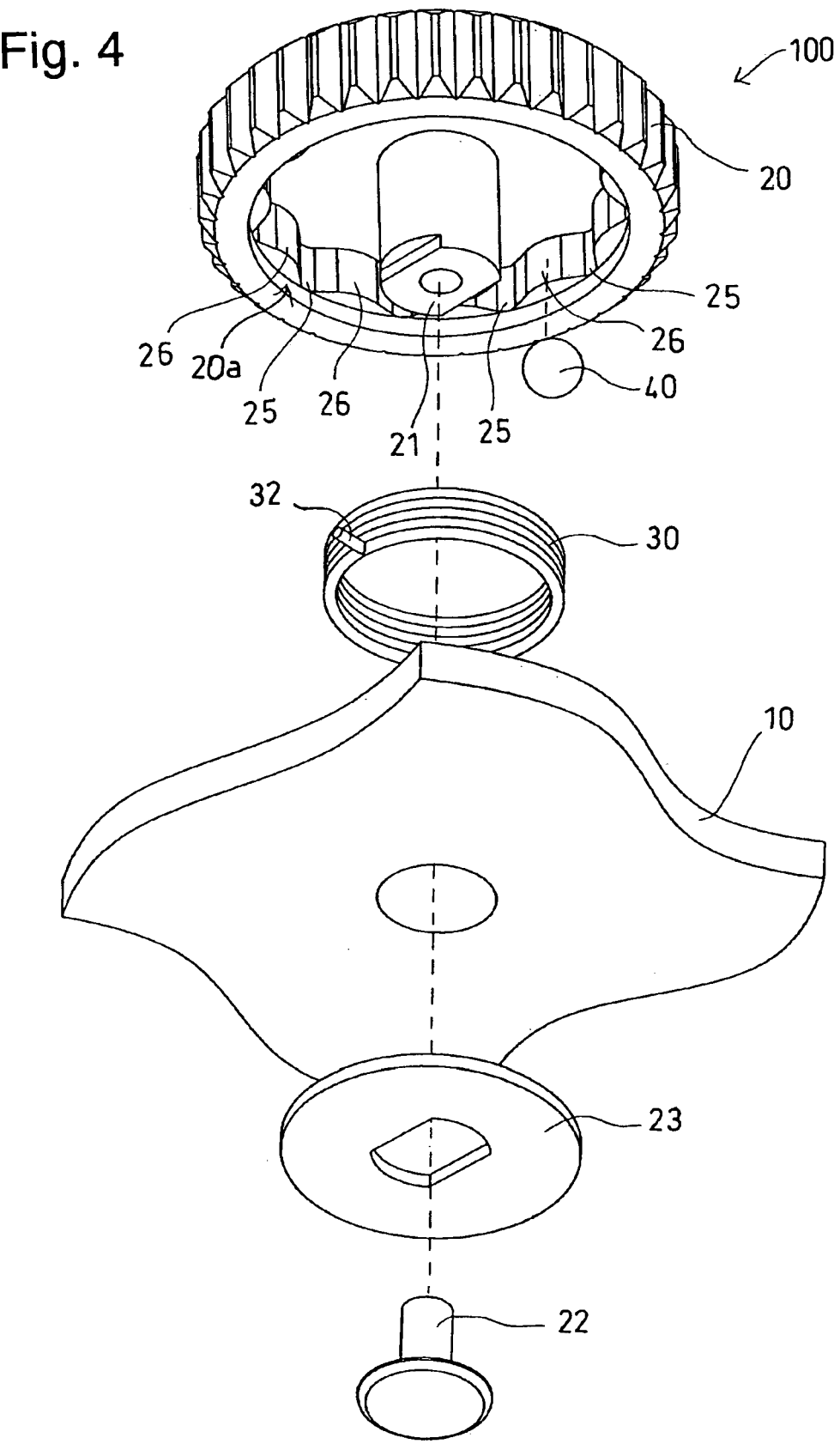
FIG. 4 is an exploded perspective view of the first embodiment of the rotary dial device having a click stop mechanism, viewed from a different angle.
Figure 5:
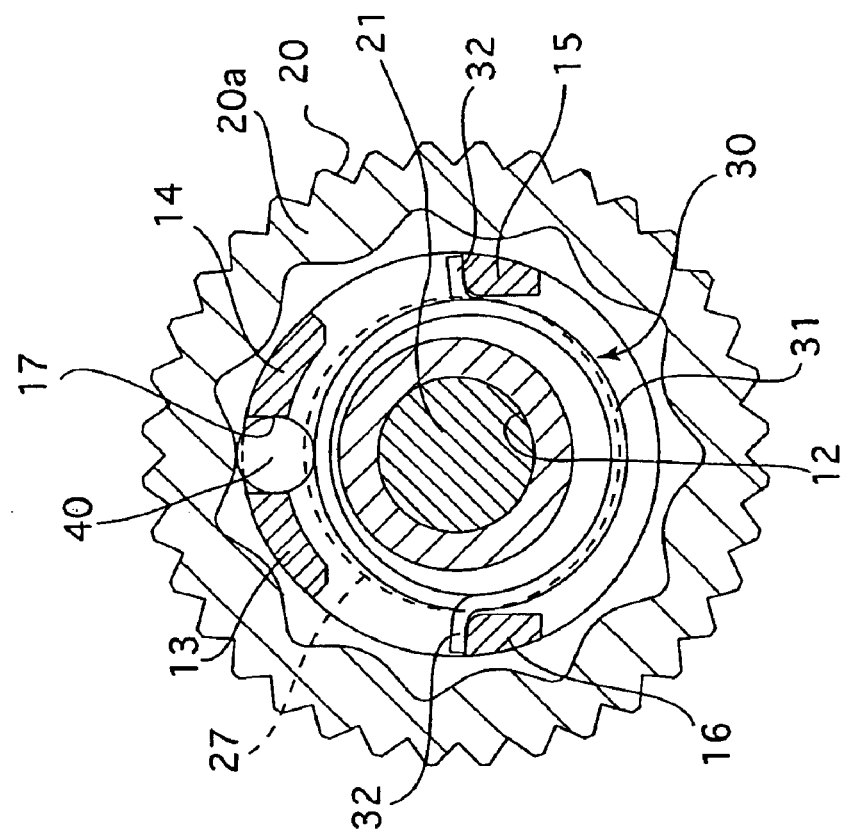
FIG. 5 is a cross sectional view of the first embodiment of the rotary dial device having a click stop mechanism, showing an internal structure thereof.
Figure 6:
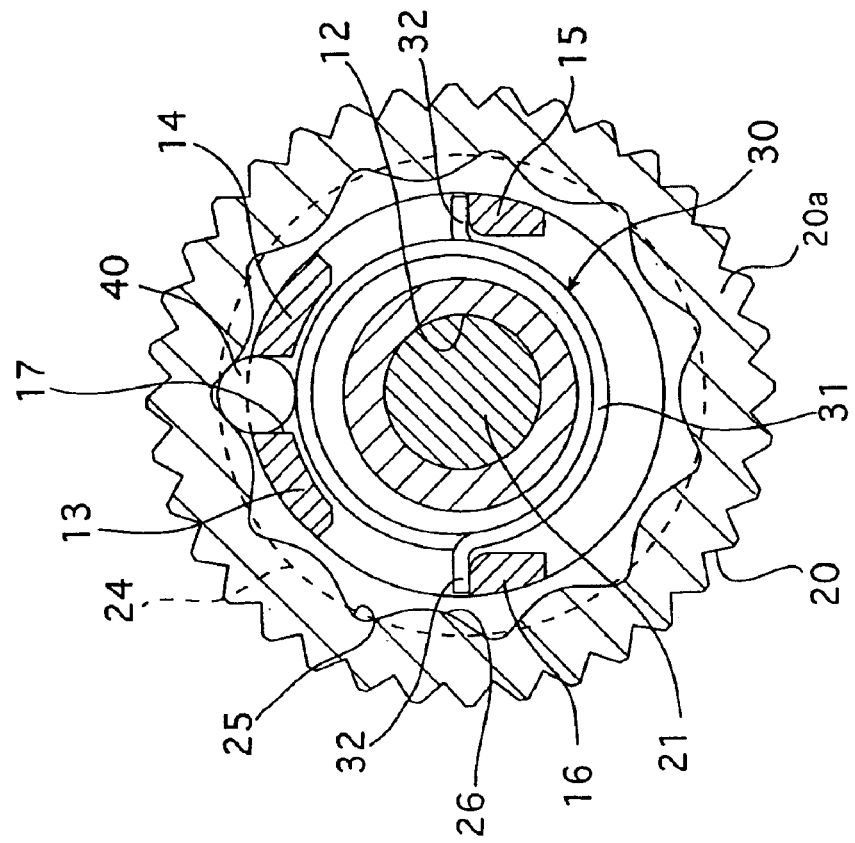
FIG. 6 is a view similar to that of FIG. 5 and illustrates the first embodiment of the rotary dial device having a click stop mechanism, showing the internal structure thereof in a different state.

FIGS. 1 through 6 show a first embodiment of a rotary dial device having a click stop mechanism according to the present invention. A rotary dial device 100 is provided with a base plate (stationary member) 10, a rotary dial 20, a torsion coil spring (cylindrical resilient member) 30 and a ball 40. The rotary dial 20 serves as an electronic select dial of a camera.

The base plate 10 is a part of an exterior wall forming a camera body. The base plate 10 is provided on an outer surface thereof with a circular protuberance 11, and is provided on the circular protuberance 11 with a hollow cylindrical portion 12 positioned at the center of the circular protuberance 11. The base plate 10 is provided, on the edge of the circular protuberance 11 around the hollow cylindrical portion 12, with four fixed walls: a first wall 13, a second wall 14, a third wall 15 and a fourth wall 16, all of which project outwards (upwards as viewed in FIG. 3) from the circular protuberance 11 in a direction parallel to the axis of the hollow cylindrical portion 12. Between the first and second walls 13 and 14, which are positioned adjacent to each other, is formed a ball guide groove 17 in which the ball 40 is positioned. The ball guide groove 17 extends in a radial direction of the rotary dial 20 to allow the ball 40 to move in the radial direction of the rotary dial 20. The third and fourth walls 15 and 16 serve as spring hold members which are engaged with opposite engaging ends 32 of the torsion coil spring 30. The radial length of the ball guide groove 17 (which corresponds to the thickness of each of the first and second walls 13 and 14) is smaller than the diameter of the ball 40. Accordingly, the ball 40 is positioned in the ball guide groove 17 to be movable in a radial direction of the rotary dial 20 and to be capable of projecting radially outwards from the radially outer end of the ball guide groove 17.

The rotary dial 20 is provided along the axis thereof with a shaft portion 21 which is rotatably fitted into the hollow cylindrical portion 12 of the base plate 10. After the shaft portion 21 is inserted into the hollow cylindrical portion 12, a washer 23 is fixed to a bottom end of the shaft portion 21 underneath the base plate 10 by a fixing pin 22 to prevent the shaft portion 21 from coming off from the hollow cylindrical portion 12.

The rotary dial 20 is provided with a circumferential wall 20a, an outer peripheral surface of which is knurled, and is provided on an inner periphery of the circumferential wall with an undulated surface on which protrusions 26 and depressions 25 are alternately arranged at equi-angular intervals along an imaginary cylindrical surface 24 (shown by a broken line in FIG. 5) about the hollow cylindrical portion 12, wherein the imaginary cylindrical surface 24 is positioned radially outside the ball guide groove 17 with the axis of the imaginary cylindrical surface 24 on the axis of the shaft portion 21. The depressions 25 and the protrusions 26 are smoothly connected to each other to form the undulated surface. In other words, the protrusions 26 and the depressions 25 are alternately formed on an inner periphery of the rotary dial 20 about the axis of the inner periphery which is common with the axis of the shaft portion 21.

The torsion coil spring 30 is provided with a coiled spring portion 31 and the opposite engaging ends 32 which project radially outwards in substantially opposite directions from the opposite ends of the coiled spring portion 31. The coiled spring portion 31 is positioned around the hollow cylindrical portion 12, and is positioned radially inside the first through fourth walls 13 through 16 of the base plate 10. Accordingly, the coiled spring portion 31 lies substantially on an imaginary cylindrical surface 27 with the axis thereof on the axis of the shaft portion 21. The opposite engaging ends 32 of the torsion coil spring 30 are engaged with the third and fourth walls 15 and 16 with the coil spring portion 31 being slightly twisted. In this state, the torsion coil spring 30 is positioned stably while biasing the ball 40, which is positioned in the ball guide groove 17, radially outwards from the ball guide groove 17 to bring the ball 40 into pressing contact with any one protrusion 26 or depression 25.

In the above-described simple structure of the rotary dial device 100, rotating the rotary dial 20 causes the protrusions 26 and the depressions 25 to be alternatively engaged with the ball 40. The biasing force of the torsion coil spring 30 which is applied to the ball 40 is smallest when the ball 40 is engaged in any one of the plurality of depressions 25, and greatest when the ball 40 is engaged in any one of the plurality of protrusions 26. This makes the rotary dial 20 stop with a click at any of the plurality of depressions 25. When the rotary dial 20 stops at any one of a plurality of click-stopped positions which are respectively determined by the plurality of depressions 25, an output device (not shown) normally outputs a signal corresponding to the one of the predetermined plurality of click-stopped positions to a CPU of a camera. However, the present invention is not limited solely to this particular signal-outputting operation which is performed depending on the rotational position of the rotary dial 20, any other operation can be performed in accordance with the rotational position of the rotary dial 20.

Figure 7:
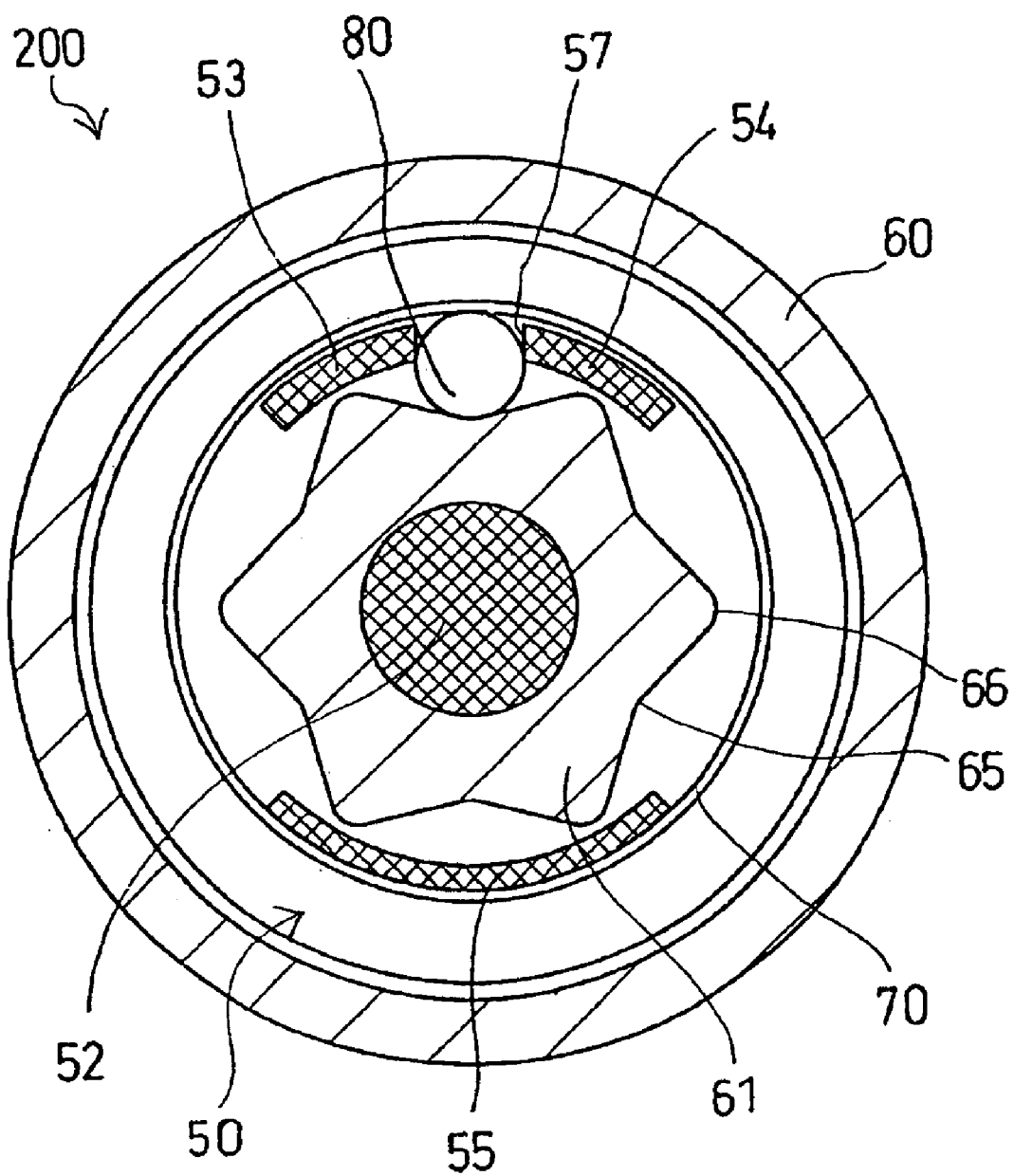
FIG. 7 is a cross sectional view of a second embodiment of the rotary dial device having a click stop mechanism according to the present invention, showing an internal structure thereof.
Figure 8:
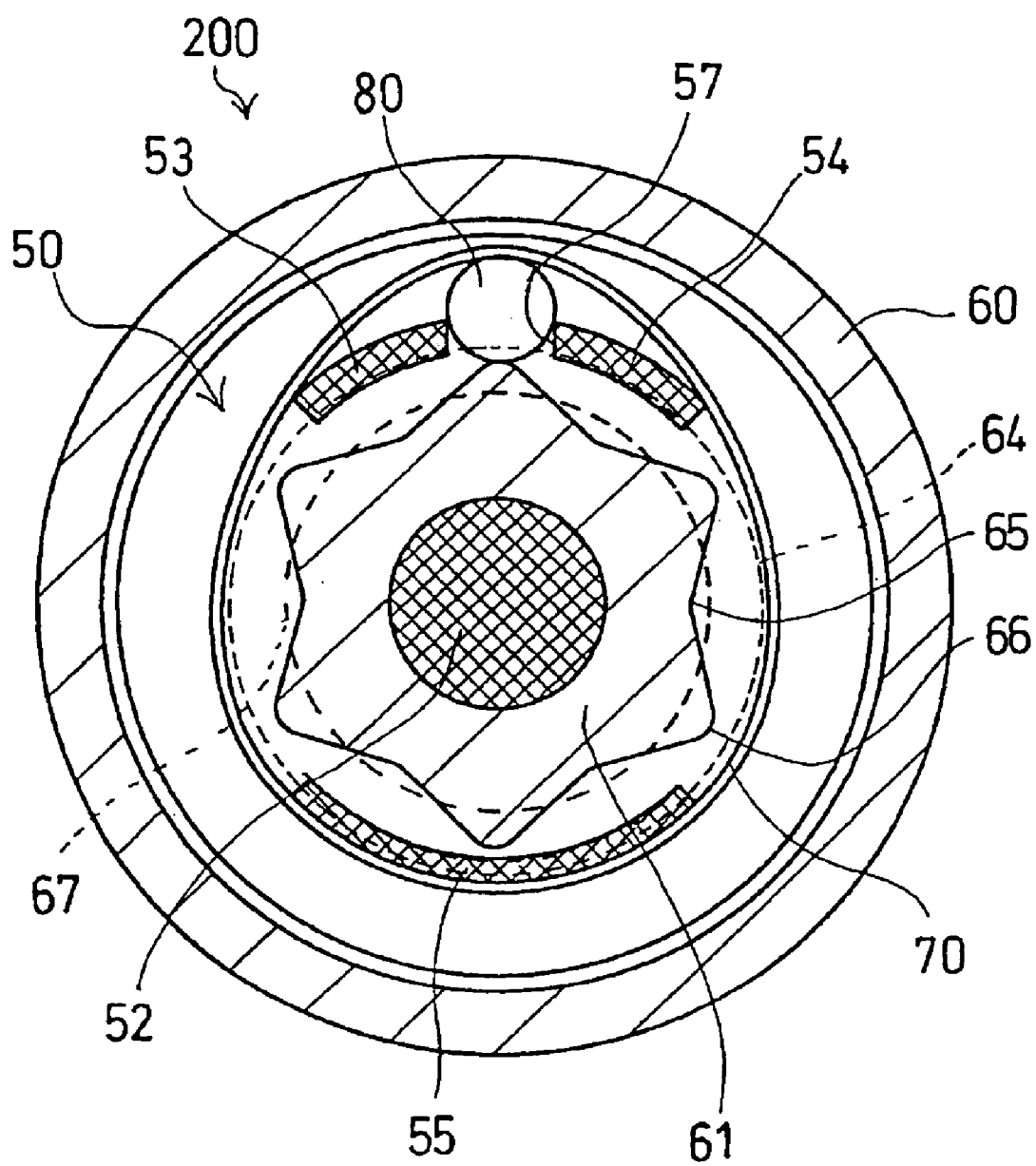
FIG. 8 is a view similar to that of FIG. 7 and illustrates the second embodiment of the rotary dial device having a click stop mechanism, showing the internal structure thereof in a different state.
Figure 9:
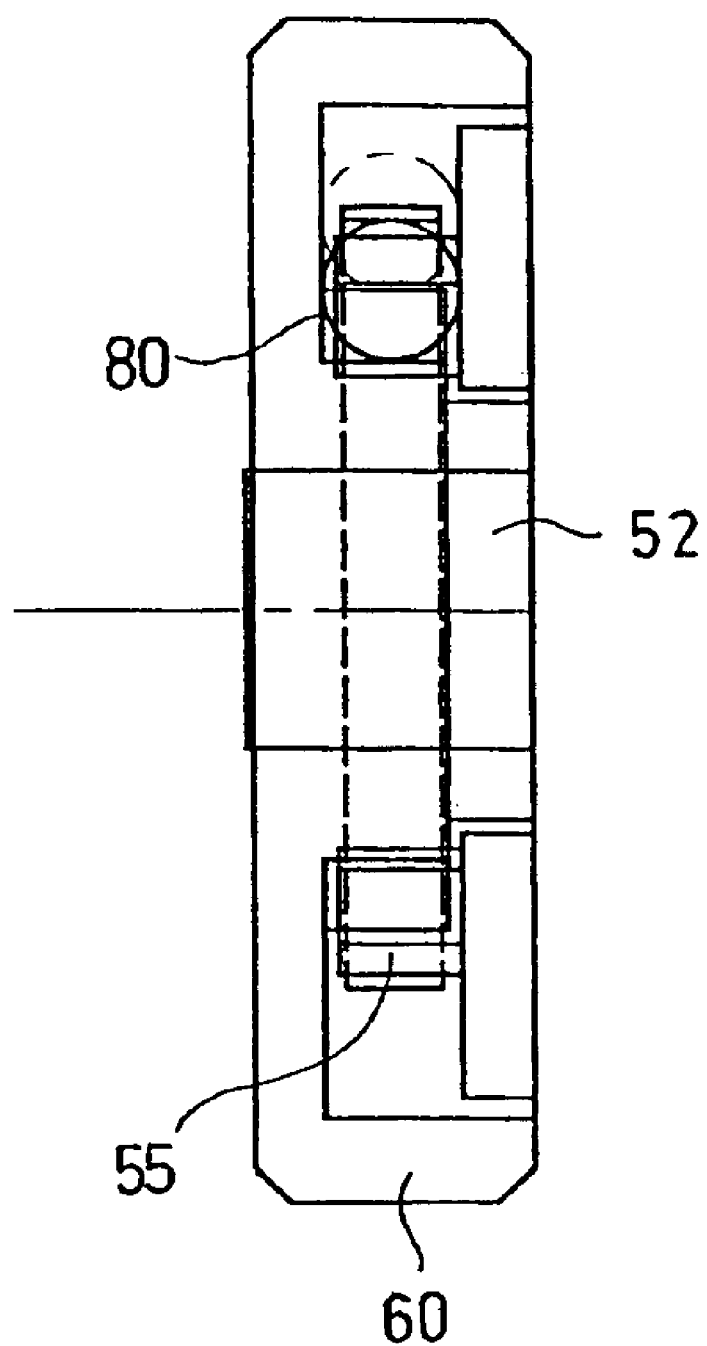
FIG. 9 is an axial cross sectional view of the second embodiment of the rotary dial device having a click stop mechanism, showing the internal structure thereof.

FIGS. 7 through 9 show a second embodiment of a rotary dial device according to the present invention. A rotary dial device 200 is provided with a base plate (stationary member) 50, a rotary dial 60, a ring spring (cylindrical resilient member) 70 and a ball 80. The ring spring 70 is made of resilient synthetic resin.

The base plate 50 is provided with a cylindrical column 52 which projects in a direction orthogonal to an outer surface of the base plate 50, and is provided around the cylindrical column 52 with three fixed walls: a first wall 53, a second wall 54 and a third wall 55. The first, second and third walls 53, 54 and 55 substantially lie on an imaginary cylindrical surface 64 (shown by a broken line in FIG. 8) to support the ring spring 70 which is positioned around the first, second and third walls 53, 54 and 55. The first and second walls 53 and 54 are positioned substantially on the opposite side of the cylindrical column 52 from the third wall 55. Between the first and second walls 53 and 54 is formed a ball guide groove 57 in which the ball 80 is positioned. The ball guide groove 57 extends in a radial direction of the rotary dial 60 to allow the ball 80 to move in the radial direction of the rotary dial 20.

The rotary dial 60 is provided along the axis thereof with an internal cylindrical portion 61 which is rotatably fitted into the cylindrical column 52 of the base plate 50. The internal cylindrical portion 61 is provided around an outer peripheral surface thereof with an undulated surface on which protrusions 66 and depressions 65 are alternately arranged at equi-angular intervals along an imaginary cylindrical surface 67 (shown by a broken line in FIG. 8) about the cylindrical column 52, wherein the imaginary cylindrical surface 67 is positioned radially inside the first and second walls 53 and 54, which form the ball guide groove 57 therebetween. The depressions 65 and the protrusions 66 are smoothly connected to each other to form the undulated surface.

The ring spring 70 is positioned around the first, second and third walls 53, 54 and 55 to bias the ball 80, which is positioned in the ball guide groove 57, radially inwards to bring the ball 80 into pressing contact with any one protrusion 66 or depression 65.

In the above-described simple structure of the rotary dial device 200, rotating the rotary dial 60 causes the protrusions 66 and the depressions 65 to be alternatively engaged with the ball 80. The biasing force of the ring spring 70 which is applied to the ball 80 is smallest when the ball 80 is engaged in any one of the plurality of depressions 65, and greatest when the ball 80 is engaged in any one of the plurality of protrusions 66. This makes the rotary dial 60 stop with a click at any of the plurality of depressions 65. It is desirable for the depth of the ball guide groove 57 in a radial direction of the rotary dial 60 to be smaller than the diameter of the ball 80 to make the clicking action felt more reliably when the rotary dial 60 is rotated. Other structures, actions and effects are substantially identical to those in the first embodiment of the rotary dial device 100.

Although a ball guide groove (17 or 57) is formed on a stationary member (10 or 50) while protrusions (26 or 66) and depressions (25 or 65) are formed on a rotary dial (20 or 60) in each of the above described first and second embodiments of the rotary dial devices, the ball guide groove can be formed on the rotary dial while the protrusions and the depressions can be formed on the stationary member, wherein a resilient member (which corresponds to the torsion coil spring 30 or the ring spring 70) and a ball (which corresponds to the ball 40 or 80) can be disposed on the rotary dial to be supported thereby.

Obvious changes may be made in the specific embodiments of the present invention described herein, such modifications being within the spirit and scope of the invention claimed. It is indicated that all matter contained herein is illustrative and does not limit the scope of the present invention.

As can be understood from the foregoing, according to the present invention, a simple rotary dial device having a click stop mechanism is achieved by the arrangement wherein depressions and protrusions are formed integral with a rotary dial so that a ball is engaged with any one of the depressions by resiliency of a resilient member. This rotary dial device having a click stop mechanism is space-saving and can be easily assembled.

What is claimed is:

1. A rotary dial device having a click stop mechanism, comprising:

a stationary member;

a circular rotary dial supported by said stationary member to be rotatable;

a ball guide groove formed on said stationary member and extending in a radial direction of said circular rotary dial;

a ball positioned in said ball guide groove;

at least one protrusion and at least one depression on said circular rotary dial along one of two imaginary cylindrical surfaces with axes thereof on an axis of said circular rotary dial, said two imaginary cylindrical surfaces being positioned radially outside and inside said ball guide groove in said radial direction of said circular rotary dial, respectively; and a cylindrical resilient member positioned along the other of said two imaginary cylindrical surfaces to bring said ball into pressing contact with any one of the protrusion and the depression by a resiliency of said cylindrical resilient member, wherein the circular rotary dial is supported by the stationary member such that the ball, the ball guide groove and the cylindrical resilient member are covered by the circular rotary dial and the stationary member.

2. The rotary dial device according to claim 1, wherein said cylindrical resilient member comprises a coil spring.

3. The rotary dial device according to claim 2, wherein said coil spring includes two engaging ends which extend in substantially opposite radial directions of said coil spring, and wherein said stationary member includes two engaging protrusions which are engaged with said two engaging ends, respectively.

4. The rotary dial device according to claim 1, wherein said protrusion and said depression are formed on an inner periphery of a circumferential wall of said circular rotary dial.

5. The rotary dial device according to claim 1, wherein said protrusion and said depression are formed on an outer peripheral surface of an internal cylindrical portion of said circular rotary dial.

6. A rotary dial device having a click stop mechanism, comprising:

a stationary member;

a rotary dial supported by said stationary member to be rotatable;

at least one protrusion and at least one depression which are formed on an inner periphery of said rotary dial;

a ball guide groove formed on said stationary member to extend in a radial direction of said rotary dial and to be positioned radially inside said inner periphery of said rotary dial in said radial direction thereof;

a ball positioned in said ball guide groove; and a cylindrical resilient member which urges said ball into pressing contact with said inner periphery of said rotary dial, wherein said cylindrical resilient member is positioned radially inside said ball guide groove in said radial direction thereof, and is substantially concentric with said rotary dial.

7. The rotary dial device according to claim 6, wherein said cylindrical resilient member includes a torsion coil spring which has two engaging ends extending in substantially opposite radial directions of said coil spring, and wherein said stationary member includes two engaging protrusions which are engaged with said two engaging ends, respectively.

8. A rotary dial device having a click stop mechanism, comprising:

a stationary member;

a circular rotary dial supported by said stationary member to be rotatable about an axis;

at least one protrusion and at least one depression on an outer peripheral surface of an internal cylindrical portion of said circular rotary dial;

a ball guide groove formed on said stationary member to extend in a radial direction of said circular rotary dial and to be positioned radially outside said outer peripheral surface of said internal cylindrical portion in said radial direction of said circular rotary dial;

a ball positioned in said ball guide groove; and a cylindrical resilient member which urges said ball into pressing contact with said outer peripheral surface of said internal cylindrical portion, wherein said cylindrical resilient member is positioned radially outside said ball guide groove in said radial direction thereof, and is concentric with said rotary dial and wherein the circular rotary dial is supported by the stationary member such that the ball, the ball guide groove and the cylindrical resilient member are covered by the circular rotary dial and the stationary member.

9. The rotary dial device according to claim 8, wherein said cylindrical resilient member comprises a ring spring.

10. A rotary dial device having a click stop mechanism, comprising:

a stationary member;

a circular rotary dial supported on said stationary member to be rotatable about an axis;

a ball guide groove formed on said stationary member to extend in a radial direction of said circular rotary dial;

a ball positioned in said ball guide groove;

an undulated surface on which protrusions and depressions are alternately arranged and which is formed on said circular rotary dial to be positioned about said axis; and a cylindrical resilient member positioned about said axis to urge said ball into pressing contact with said undulated surface by resiliency of said cylindrical resilient member, wherein said ball guide groove is positioned between said undulated surface and said cylindrical resilient member in said radial direction of said circular rotary dial, and wherein the circular rotary dial is supported by the stationary member such that the ball, the ball guide groove and the cylindrical resilient member are covered by the circular rotary dial and the stationary member.

11. A rotary dial device having a click stop mechanism, comprising:

a stationary member having an axial shaft;

a circular rotary dial having a cylindrical portion which is fitted on said axial shaft to be freely rotatable on said axial shaft;

a ball guide groove formed on said stationary member to extend in a radial direction of said circular rotary dial;

a ball positioned in said ball guide groove;

an undulated surface on which protrusions and depressions are alternately arranged and which is formed on an outer peripheral surface of said cylindrical portion; and a cylindrical resilient member positioned around said cylindrical portion to urge said ball into pressing contact with said undulated surface by resiliency of said cylindrical resilient member, wherein said ball guide groove is positioned between said undulated surface and said cylindrical resilient member in said radial direction of said circular rotary dial, and wherein the circular rotary dial is supported by the stationary member such that the ball, the ball guide groove and the cylindrical resilient member are covered by the circular rotary dial and the stationary member.

* * * * *